(12) United States Patent
Gandhi

(10) Patent No.: US 11,108,826 B2
(45) Date of Patent: Aug. 31, 2021

(54) SECURITY MODES FOR ENHANCED NETWORK SECURITY

(71) Applicant: McAfee, LLC, Santa Clara, CA (US)

(72) Inventor: Niraj Gandhi, Santa Clara, CA (US)

(73) Assignee: McAfee, LLC, San Jose, CA (US)

( * ) Notice: Subject to any disclaimer, the term of this patent is extended or adjusted under 35 U.S.C. 154(b) by 219 days.

(21) Appl. No.: 15/854,521

(22) Filed: Dec. 26, 2017

(65) Prior Publication Data

US 2019/0199752 A1 Jun. 27, 2019

(51) Int. Cl.
| | |
|---|---|
| *H04W 12/088* | (2021.01) |
| *H04W 12/00* | (2021.01) |
| *H04W 12/30* | (2021.01) |
| *H04L 29/06* | (2006.01) |
| *H04L 12/28* | (2006.01) |

(52) U.S. Cl.
CPC ............ *H04L 63/20* (2013.01); *H04L 63/101* (2013.01); *H04L 63/104* (2013.01); *H04L 63/108* (2013.01); *H04W 12/00* (2013.01); *H04W 12/088* (2021.01); *H04W 12/30* (2021.01); *H04L 12/28* (2013.01)

(58) Field of Classification Search
CPC ..... H04L 63/20; H04L 63/101; H04L 63/104; H04L 63/108; H04L 12/28; H04W 12/088; H04W 12/00; H04W 12/30
See application file for complete search history.

(56) References Cited

U.S. PATENT DOCUMENTS

| | | | |
|---|---|---|---|
| 6,374,145 B1 * | 4/2002 | Lignoul | G06F 21/35 |
| | | | 700/17 |
| 2004/0022242 A1 * | 2/2004 | Bhogal | H04L 63/10 |
| | | | 370/389 |

(Continued)

FOREIGN PATENT DOCUMENTS

WO 2011119264 9/2011

OTHER PUBLICATIONS

Dous, "How can I enter into WiFi router set up page on android phone?", https://www.quora.com/How-can-I-enter-into-WiFi-router-set-up-page-on-android-phone, Sep. 6, 2017, (hereinafter "Dous"). (Year: 2017).*

(Continued)

*Primary Examiner* — Jung W Kim
*Assistant Examiner* — Howard H. Louie
(74) *Attorney, Agent, or Firm* — Hanley, Flight & Zimmerman, LLC

(57) ABSTRACT

Techniques related to enhanced security modes for securing a network are disclosed. The techniques include a machine readable medium, on which are stored instructions, comprising instructions that when executed cause a device to receive an indication of a security mode of a plurality of security modes, the security mode comprising a set of security settings associated with a set of network connected devices, of a plurality of network connected devices connected to a local network, and wherein the set of security settings comprises at least blocking network access of the set of network connected devices, select the set of network connected devices based on the indicated security mode, and directing an application of the set of security settings to the selected set of network connected devices.

20 Claims, 8 Drawing Sheets

(56) References Cited

U.S. PATENT DOCUMENTS

2011/0162060 A1\* 6/2011 Vijayakumar ........ H04L 12/413
                                                    726/13
2014/0167929 A1  6/2014 Shim et al.
2017/0250823 A1\* 8/2017 Glenn ................. H04L 63/1433

OTHER PUBLICATIONS

International Searching Authority, "International Search Report," issued in connection with application No. PCT/US2018/066876, dated Feb. 20, 2019, 4 pages.

International Searching Authority, "Written Opinion," issued in connection with application No. PCT/US2018/066876, dated Feb. 20, 2019, 6 pages.

Netgear: "Nighthawk X4Sac2600 smart WiFi Router User Manual," Jan. 31, 2017, p. 44-45, p. 97-98, 160 pages.

The International Bureau of WIPO, "International Preliminary Report on Patentability," issued in connection with application No. PCT/US2018/066876, dated Jun. 30, 2020, 7 pages.

\* cited by examiner

SECURITY MODES FOR ENHANCED NETWORK SECURITY

TECHNICAL FIELD

Embodiments described herein generally relate to network security and privacy and, more particularly, to security modes for enhanced network security by blocking network access for a set of devices.

BACKGROUND ART

The field of network security has become increasingly important and complicated in today's society. Network environments are configured for virtually every home, enterprise, or organization, typically with multiple interconnected computers (e.g., end user computers, laptops, servers, printing devices, Internet of Things (IoT) devices, etc.). In many enterprises, Information Technology (IT) administrators may be tasked with maintenance and control of the network environment, including executable software files (e.g., web application files) on hosts, servers, and other network computers. At home, a generally less experienced end user may handle such tasks with wide variety of devices operating in a generally less controlled network environment. As the number of executable software files in a network environment increases, the ability to control, maintain, and remediate these files efficiently can become more difficult. Furthermore, computer and communications networks today encompass mobile devices such as smartphones, tablet computers and the like, which allow users to download and install applications on these devices quickly and with minimal oversight. Thus, innovative tools are needed to assist home users and IT administrators in the effective control and management of applications and devices operating within their communication network environments. Such tools may include tools for security modes for enhanced network security.

Such tools may run on a routing device, such as a router. A routing device generally acts to forward packets, such as internet protocol (IP) packets between one network, such as the internet, to devices on another network, such as a local network, sometimes referred to as an internal network, intranet, or a local area network (LAN). The routing device may interconnect any number of networks together provided sufficient network interfaces, generally one network interface for each network. For example, a typical home router may include a network interface for the internet, a wired network, and a wireless network. The routing device may join multiple networks into a single logical network such that devices on the logical network appear to be on the same network, such as joining the wired network and wireless network together to form a single local network. Local networks may also include multiple routing devices operating together.

A routing device may also include an integrated switching device. The switching device generally functions to direct network traffic to a specific network port. For example, a switching device may maintain a record of the media access control (MAC) addresses of all devices connected to the switching device associated with the specific network port that each device is connected to. The switching device may then direct network traffic directly to the appropriate network port, rather than, for example, broadcasting the network traffic to all network ports.

As routing devices are used to interconnect a local network with the internet, certain routing devices, such as a router configured with McAfee® (McAfee is a registered trademark owned by McAfee, LLC) Secure Home Platform (SHP), may be configured with security tools such as tools to block, or pause internet access to certain devices.

According to certain aspects of the present disclosure, the block functionality may be extended in the context of network security. For example, malware needs a connection between two devices to spread. This connection may be between a device located on the external network and another device on the internal network, or between two devices connected to the internal network. Blocking a local device's network access to other devices, both on the internal network and on the internet, at the router helps increase security by blocking the typical connection through which malware may spread. Additionally, as the number and complexity of internet connected devices (e.g., video streamers, Internet of Things (IoT) devices, etc.) added to networks increase, it may be desirable to disable internet connectivity or alter other router security settings associated with a set of these devices in certain conditions, such as at night, to help increase privacy, increase data use efficiency, and prevent unauthorized access.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by the programmable device. Similarly, "a machine-readable medium" can refer to a single physical medium or a plurality of media that together may store the material described as being stored on the machine-readable medium.

As used herein, the term "a computer system" can refer to a single computer or a plurality of computers working together to perform the function described as being performed on or by a computer system.

As used herein, the term "medium" and "storage" refer to one or more non-transitory physical media that together store the contents described as being stored thereon. Embodiments may include non-volatile secondary storage, read-only memory (ROM), and/or random-access memory (RAM).

A routing device may be configured to adjust internet connectivity and security settings for a set of devices connected to the routing device. For example, network access may be disabled for a set of devices, the ability to add new devices to a local network may be disabled, and a guest network disabled, based on a request received from a user.

Figure 1:
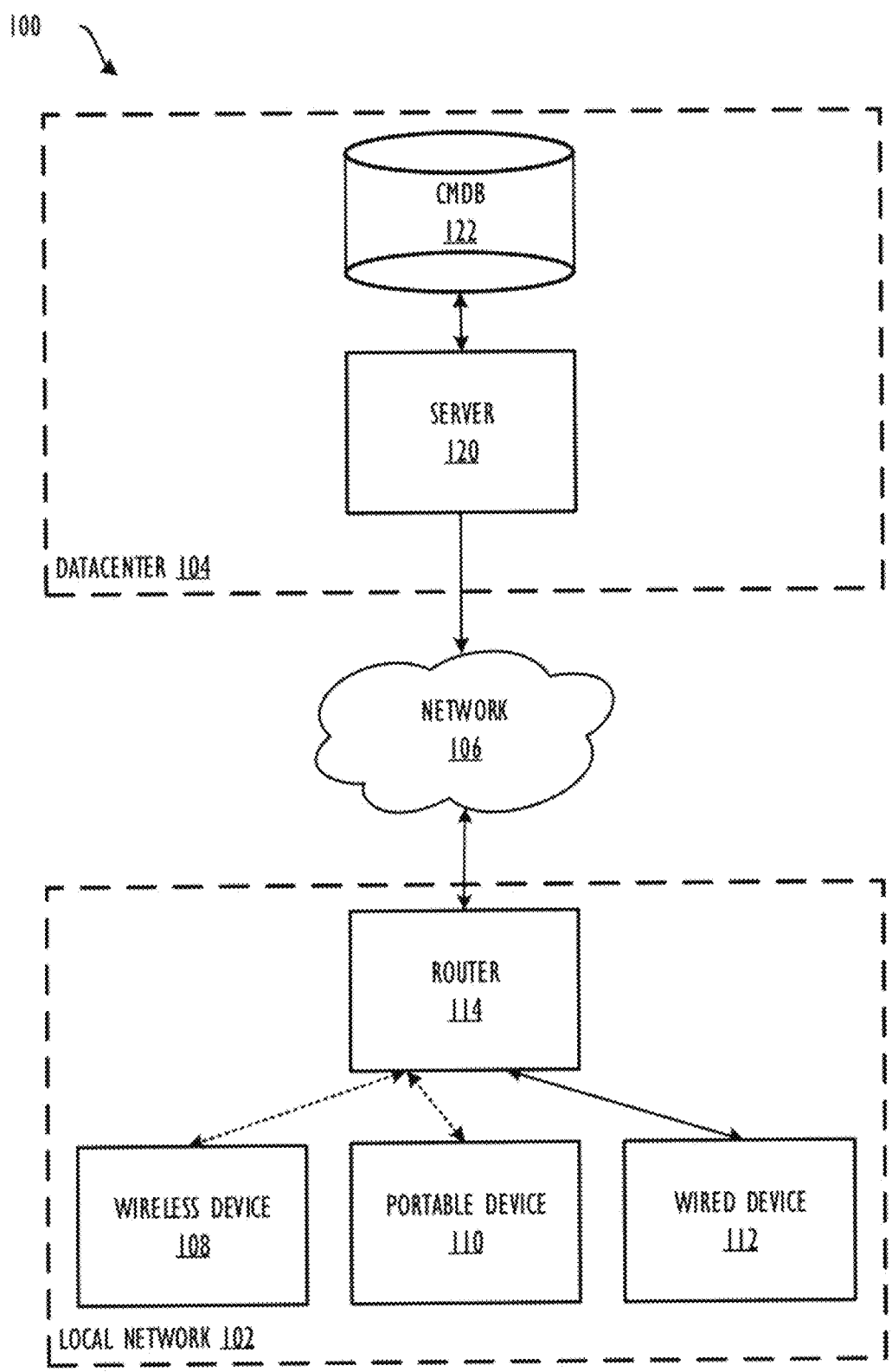
FIG. 1 is a block diagram illustrating a system for security modes for enhanced network security, in accordance with aspects of the present disclosure.

Referring now to FIG. 1, a block diagram illustrating a system 100 for security modes for enhanced network security, in accordance with aspects of the present disclosure. The system 100 includes a local network 102 connected to a datacenter 104, via a network 106, such as the internet. The local network 102 includes multiple devices including a wireless device 108, such as an IoT device, security camera, streaming device, etc., a portable device 110, such as a laptop, handheld, tablet, etc., and a wired device 112, such as a personal computer. These devices may be connected to the network 106 via a router 114. Further, one or more of the devices 108-112 and router 114 may connect, via network 106 to server 120 running in the datacenter 104 and connected to a database 122.

As an example, router 114 may be configured to run a client management and security platform implementing security modes to help secure the local network 102. This client platform may be controlled or configured in conjunction with a client application, such as an app running on a mobile device, a web application within a browser on a user device, or some other device. The client application may communicate with the client platform on the router 114 directly over the local network 102.

In certain cases the client application may communicate with server 120, which then communicates with the client platform on the router 114. For example, a mobile app may receive a request from a user to perform an action via an input to the mobile app UI. The mobile app may interface with server 120 and send an indication for the router 114 to perform an action to server 120. After this request is received by the server 120, the server 120 may relay, reformat, or otherwise send an indication to the router 114 directing the router 114 to perform the action. By communicating requests directly with the server 120, the user may be able to adjust security modes not just while connected with the local network 102, but also remotely while not connected to the local network 102, such as when on a cellular network. The server 120 may also include logic to prevent blocking network access of a user device running the mobile app.

Figure 2:
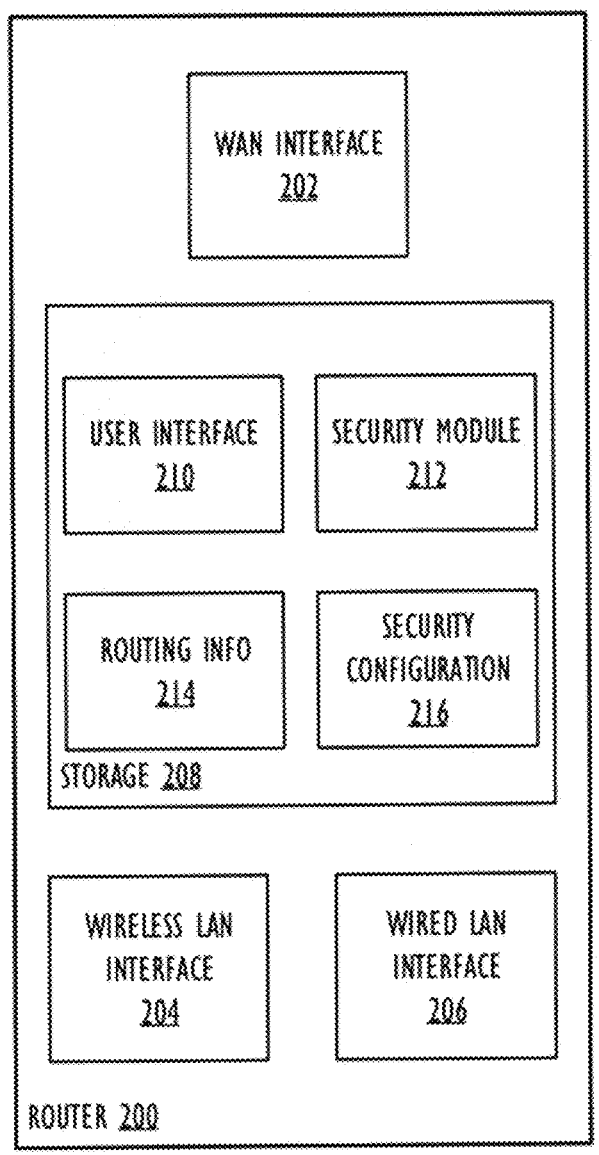
FIG. 2 is a block diagram illustrating a router configured with security modes, in accordance with aspects of the present disclosure

Referring to FIG. 2, a block diagram illustrating a router 200 configured with security modes, in accordance with aspects of present disclosure. The router 200 includes multiple network interfaces, including a wide area network (WAN) interface 202 for connecting to an external network such as the internet, as well as a wireless local area network (LAN) interface 204 and a wired LAN interface 206. The router 200 may also be configured to run software stored in storage 208. This software may include multiple modules, such as a user interface (UI) 210 and a security module 212. The security module 212 may include code configured to implement security modes. The UI 210 may include code and resources, such as icon and other UI elements, for implementing a UI. The storage 208 may also hold routing information 214 and security configuration information 216. Security settings and security modes may be stored as a part of security configuration information 216. Routing information 214 may comprise routing tables for routing data packets between the WAN and LAN devices.

Configuration and security information for the router 114, in some cases, may be stored or tracked by the server 120. For example, the server 120 may include the security module 212 and maintain security configuration information 216 for router 114, such as device lists and security settings associated with various security modes. The server 120 may transmit an indication to the router 114 when changes are made. The indication may, for example, direct the router 114 to update or make changes to the routing information 214 stored on the router 114.

It may be desirable to have enhanced network security by restricting network access of certain devices when the functionality of those devices are not being utilized. In such cases, it may be advantageous to disable network access for those device, allowing for a decreased attack surface, as well as reducing the use of network resources. For example, network access for an audio/video (AV) streaming device or smart TV may be restricted when the functionality of those devices are not needed, such as where there is no person there or late at night. There are multiple scenarios where functionality of devices may not be needed and different network security modes may be appropriate for these scenarios. For example, if no person is expected to be present for an extended period of time, the ability to add a new device to the network may be safely disabled. Disabling adding new devices may be less desirable, for example, at night, when someone may still add a device. Multiple security modes may be defined based on, for example, common situations where certain device functionality may not be needed. For example, in the case of a home user, security modes may be defined for scenarios where users are away from the home or when users are in the home, but not expected to be using certain devices, such as at night.

Figure 3:
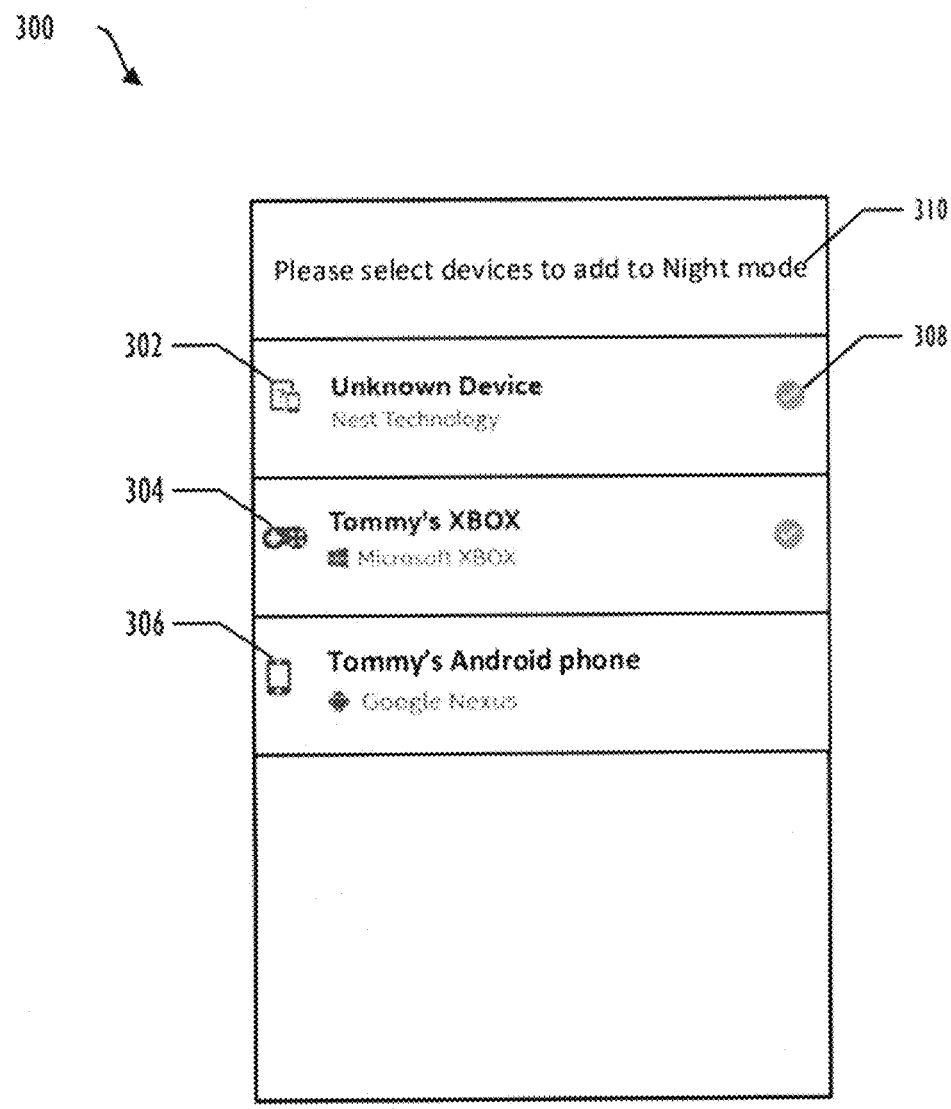
FIG. 3 illustrates UI for device selection for a security mode, in accordance with aspects of the present disclosure.
Figure 4:
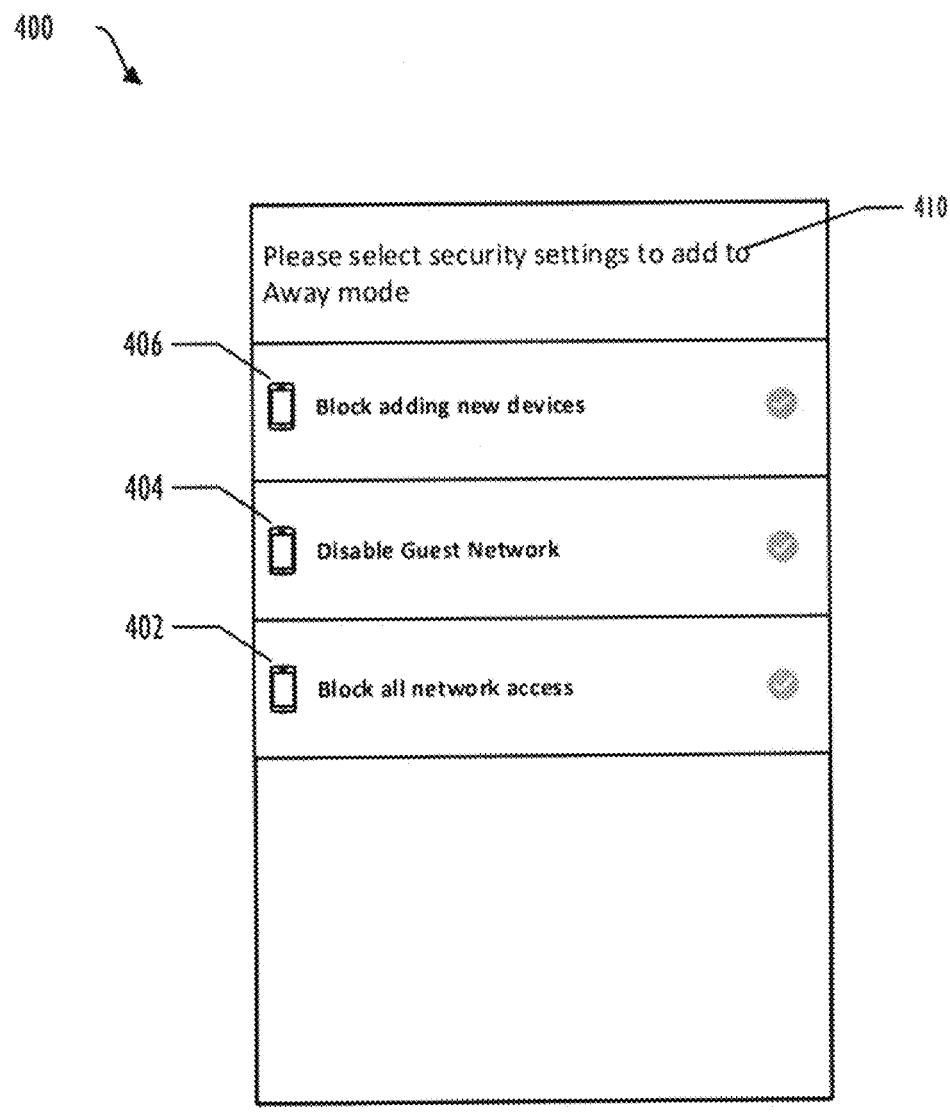
FIG. 4 illustrates a UI for security setting configuration, in accordance with aspects of the present disclosure.
Figure 5:
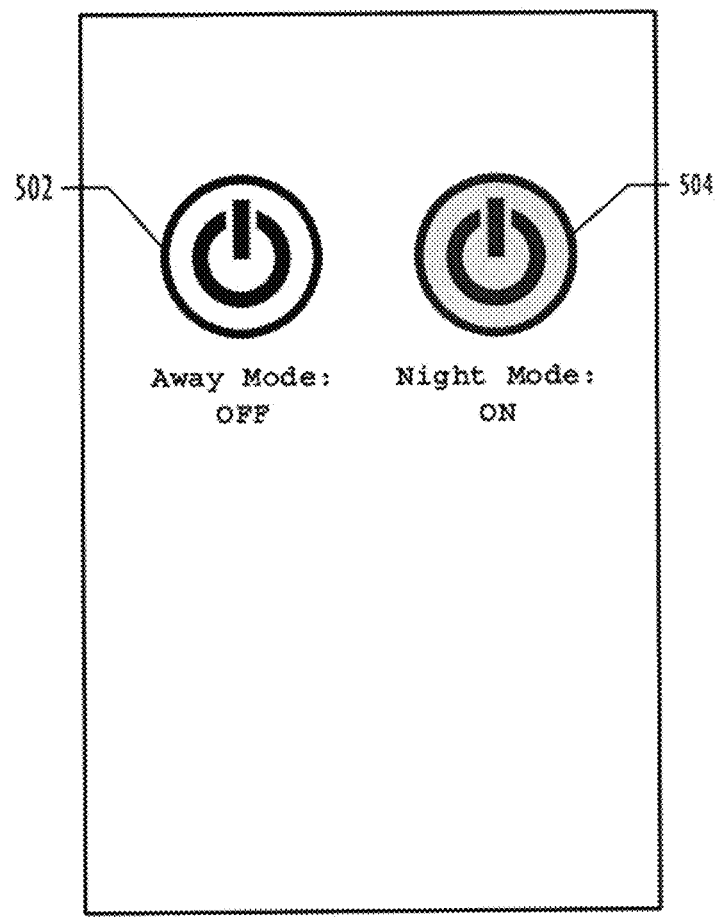
FIG. 5 illustrates a UI for controlling security modes, in accordance with aspects of the present disclosure.

Different security modes may be associated with different sets of devices to allow for adaption of the security modes to different scenarios. For example, a first security mode, such as night mode, may be associated with a different set of devices connected to the LAN than a second security mode, such as away mode. FIG. 3 illustrates UI 300 for device selection for a security mode, in accordance with aspects of the present disclosure. In certain cases, UI 300, UI 400, and UI 500 may be displayed as a part of an app running on a mobile device. In such cases, the UI 300 may be generated by the app with information provided by the router. For example, data from the router, such as information about LAN connected devices, may be provided by the router. UI components such as the layout, icons, buttons, and other UI elements may be provided by the app and these UI components may be used based on the data from the router. In other cases, UI 300, UI 400, and UI 500 may be provided by the router, for example, as a web application. UI elements in FIGS. 3, 4, and 5, are illustrative and persons having ordinary skill in the arts would understand that there are other UI elements, layouts, and formats which may be used. After receiving an indication to display devices associated with a given security mode, UI 300 may be displayed.

The UI 300, may be provided to allow a user to select devices from the LAN to associate with a certain security mode. The router may obtain information from devices connected to the LAN, such as from a wireless device 302, wired device 304, and a mobile device 306. The information may be obtained, for example, using universal plug and play (UPnP) protocol, and may include device information, such a device name, description, MAC address, and IP address. The user may select one or more devices using a selection element 308, such as a button, toggle, switch, etc., for inclusion in a security mode, as indicated by a security mode identifier element 310.

Each security mode may be associated with a separate set of devices. The set of devices may be selected by a user, for example, during set up of a security mode, after devices have been connected to the LAN, or after a new device is added to the LAN. In certain cases, devices may be automatically added to one or more security modes. For example, during set up or if a new device is added, a given device may be profiled (e.g., fingerprinted) based on information obtained from the devices, such as UPnP information. This device profile may be compared to a database, such as a local or online database, and added to one or more security modes based on the comparison. For example, a newly added device may be automatically added to a certain security mode when the device has a device profile consistent with the device profile that a majority of other users have added to the security mode.

Multiple security modes allow for further adaption of the security modes to different scenarios. For example, a router may include one or more predefined security modes, such as, a night and/or an away security mode. User-defined security modes may also be configured. Each security mode may be configured to include a set of security settings which are enabled when the security mode is active. This set of security settings may be configurable, for example by a user, for each security mode.

FIG. 4 illustrates a UI 400 for security setting configuration, in accordance with aspects of the present disclosure. After receiving an indication to display security settings for a given security mode, UI 400 may be displayed. UI 400 includes a security mode identifier element 410 identifying the security mode for which security settings may be adjusted for. One or more UI elements may be provided that may enable or disable a security setting for the security mode. For example, away mode UI element 402 indicates that away mode is configured to block all network access for devices associated with away mode, guest network UI element 404 indicates that away mode is configured to disable a configured guest network, and block new devices UI element 406 indicates that away mode is configured to block adding new devices to the LAN. Other security settings may also be provided such as, but not limited to, blocking Internet access while allowing Intranet access, scheduled times for re-enabling network access, restricting Internet access only to pre-defined sites, or other such setting. Certain security settings may modify other security settings. For example a security setting to block just internet access may modify the security setting to disable network access. Security settings which modify other security settings may appear as sub-settings of the security setting which they modify. Security setting settings may also be user-defined or customizable.

Security settings may be implemented, for example, by adjusting an appropriate router configuration. For example, blocking all network access may be implemented by adjusting routing tables to throw away (e.g., discard) all packets sent to or received from a blocked device, or forwarding the packets to another security module for further scrutiny or processing. As an example of forwarding, packets sent or received to or from the blocked device may be forwarded to another security module, such as pattern recognition enabled security module which inspects the packets for conformity to packet patterns of similar devices. This forwarding may be internal to a routing device, across multiple devices, or across networks. Similarly, blocking new devices can discard or forward all packets sent or received by any device not previously connected to the router. In certain cases, security settings may adjust or configure features not traditionally associated with router functionality. For example, activating a security mode may increase a vigilance of network monitoring, such as by SHP. This increased vigilance may, for example, adjust a sensitivity level for alerts for which a user may be notified of, adjust content filters, etc. Certain security settings or a minimum number of security settings may also be required for the security modes. For example, each security mode may be required to block network access for the associated set of devices, or each security mode must have at least one associated security setting.

FIG. 5 illustrates a UI 500 for controlling security modes, in accordance with aspects of the present disclosure. Helping facilitate use of security modes, different security modes may be easily activated. For example, UI 500 illustrates a router configured with two security modes controlled by an away mode button 502 and a Night mode button 504, respectively. The UI 500 may indicate which security mode is currently activated, such as by showing the Night mode button 504 as depressed or otherwise activated, along with a textual indication. While shown as buttons, security modes may be activated or deactivated using any applicable UI elements. In certain cases, a single security mode may be active at a time, and the router may operate in a normal mode and without restrictions associated with security modes when no security mode is activated, unless otherwise configured.

In certain cases, security modes may also be activated without going through a traditional displayed UI. For example, security modes may be tied to an IoT sensor or device. For example, a security mode may be based on an indication from the IoT sensor or a device such as a security keypad, that no person has been detected for a set period of time. A security mode may also be used to adjust a configuration of a device. For example, an instruction may be communicated to the device, such as a remote door lock, which deactivates the remote door lock, based on the security mode, or activate a home security system based on the indicated security mode. In certain cases, security modes may be scheduled, for example, to activate or deactivate a particular security mode based on a time schedule or a geofenced location.

Figure 6:
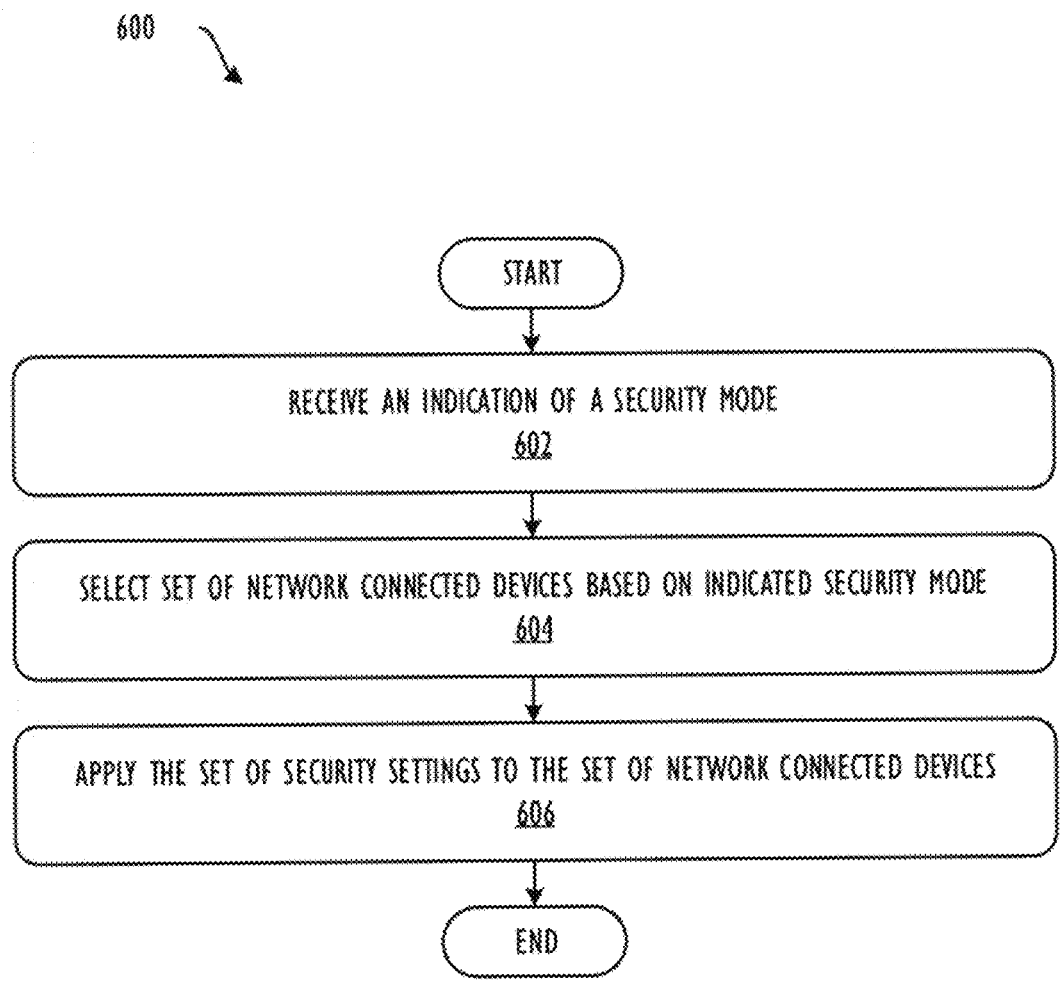
FIG. 6 is a flowchart illustrating a method for security modes for enhanced network security, in accordance with aspects of the present disclosure.

FIG. 6 is a flow diagram illustrating a method 600 for security modes for enhanced network security, in accordance with aspects of the present disclosure. At block 602, an indication of a security mode, of a plurality of security modes, is received. The indication may be received, for example, from an app running on a mobile device. The app may then directly interface with the router, or the app may interface with a server, which may then either relay the indication to the router, or direct the router to implement the indicated security mode. In other cases, the indication may be received from a web application executing, for example, in a browser on a client device. In yet other cases, the indication may be received from an IoT device, such as a sensor, keypad, or remote button. Multiple security modes may be predefined, for example on the router, to include a set of security settings and a set of devices connected by a local network to a router for each security mode. At block 604, based on the indicated security mode, a set of network connected devices is selected and at block 606, the security settings are applied for the selected set of network connected devices and network access for the selected set of network connected devices is blocked.

Figure 7:
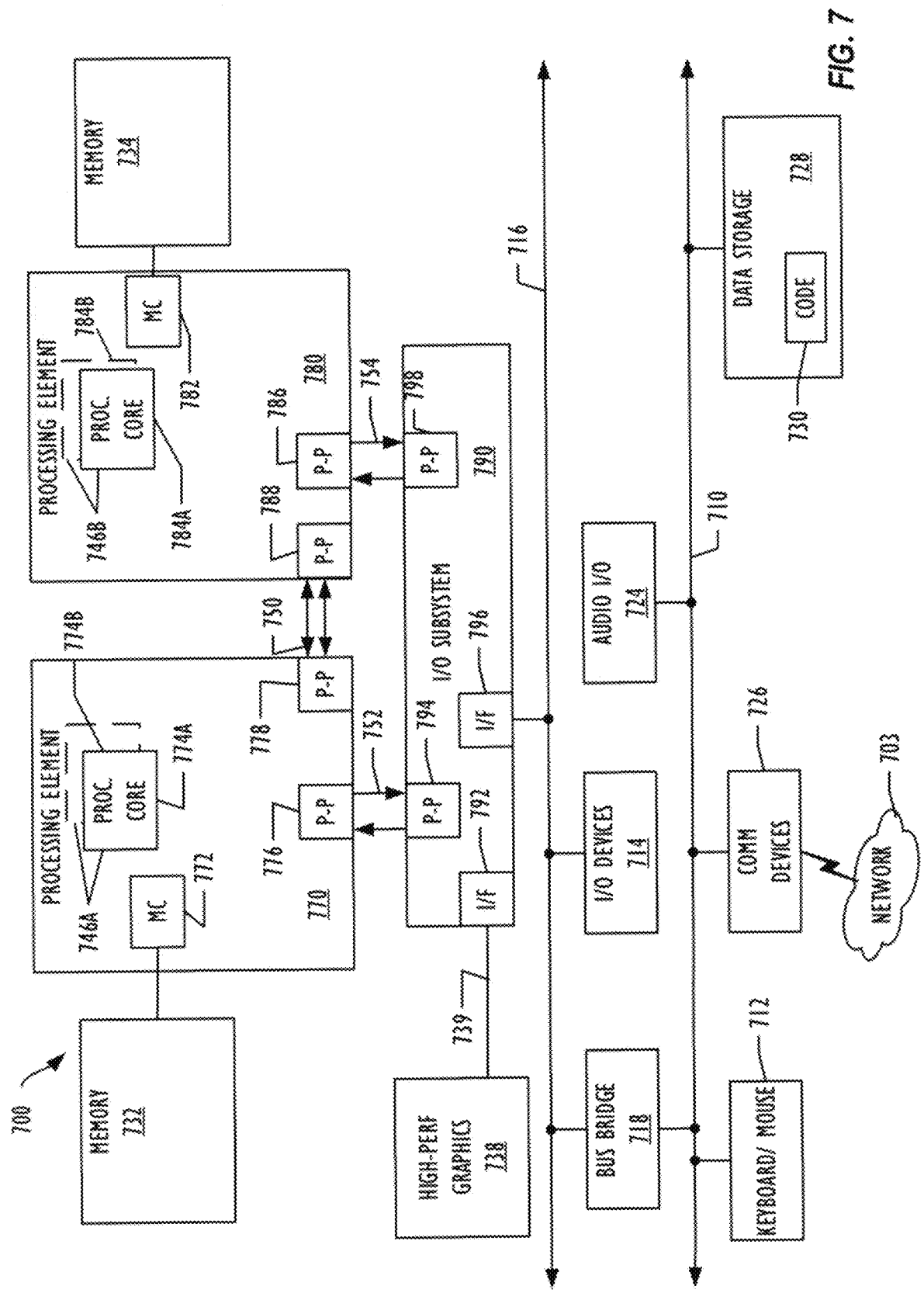
FIG. 7 is a block diagram illustrating a programmable device, according to one embodiment.

Referring now to FIG. 7, a block diagram illustrates a programmable device 700 that may be used for implementing the techniques described herein in accordance with one embodiment. The programmable device 700 illustrated in FIG. 7 is a multiprocessor programmable device that includes a first processing element 770 and a second processing element 780. While two processing elements 770 and 780 are shown, an embodiment of programmable device 700 may also include only one such processing element.

Programmable device 700 is illustrated as a point-to-point interconnect system, in which the first processing element 770 and second processing element 780 are coupled via a point-to-point interconnect 750. Any or all of the interconnects illustrated in FIG. 7 may be implemented as a multi-drop bus rather than point-to-point interconnects.

As illustrated in FIG. 7, each of processing elements 770 and 780 may be multicore processors, including first and second processor cores (i.e., processor cores 774a and 774b and processor cores 784a and 784b). Such cores 774a, 774b, 784a, 784b may be configured to execute instruction code. However, other embodiments may use processing elements that are single core processors as desired. In embodiments with multiple processing elements 770, 780, each processing element may be implemented with different numbers of cores as desired.

Each processing element 770, 780 may include at least one shared cache 746. The shared cache 746a, 746b may store data (e.g., instructions) that are utilized by one or more components of the processing element, such as the cores 774a, 774b and 784a, 784b, respectively. For example, the shared cache may locally cache data stored in a memory 732, 734 for faster access by components of the processing elements 770, 780. In one or more embodiments, the shared cache 746a, 746b may include one or more mid-level caches, such as level 2 (L2), level 3 (L3), level 4 (L4), or other levels of cache, a last level cache (LLC), or combinations thereof.

While FIG. 7 illustrates a programmable device with two processing elements 770, 780 for clarity of the drawing, the scope of the present invention is not so limited and any number of processing elements may be present. Alternatively, one or more of processing elements 770, 780 may be an element other than a processor, such as an graphics processing unit (GPU), a digital signal processing (DSP) unit, a field programmable gate array, or any other programmable processing element. Processing element 780 may be heterogeneous or asymmetric to processing element 770. There may be a variety of differences between processing elements 770, 780 in terms of a spectrum of metrics of merit including architectural, microarchitectural, thermal, power consumption characteristics, and the like. These differences may effectively manifest themselves as asymmetry and heterogeneity amongst processing elements 770, 780. In some embodiments, the various processing elements 770, 780 may reside in the same die package.

First processing element 770 may further include memory controller logic (MC) 772 and point-to-point (P-P) interconnects 776 and 778. Similarly, second processing element 780 may include a MC 782 and P-P interconnects 786 and 788. As illustrated in FIG. 7, MCs 772 and 782 couple processing elements 770, 780 to respective memories, namely a memory 732 and a memory 734, which may be portions of main memory locally attached to the respective processors. While MC logic 772 and 782 is illustrated as integrated into processing elements 770, 780, in some embodiments the memory controller logic may be discrete logic outside processing elements 770, 780 rather than integrated therein.

Processing element 770 and processing element 780 may be coupled to an I/O subsystem 790 via respective P-P interconnects 776 and 786 through links 752 and 754. As illustrated in FIG. 7, I/O subsystem 790 includes P-P interconnects 794 and 798. Furthermore, I/O subsystem 790 includes an interface 792 to couple I/O subsystem 790 with a high performance graphics engine 738. In one embodiment, a bus (not shown) may be used to couple graphics engine 738 to I/O subsystem 790. Alternately, a point-to-point interconnect 739 may couple these components.

In turn, I/O subsystem 790 may be coupled to a first link 716 via an interface 796. In one embodiment, first link 716 may be a Peripheral Component Interconnect (PCI) bus, or a bus such as a PCI Express bus or another I/O interconnect bus, although the scope of the present invention is not so limited.

As illustrated in FIG. 7, various I/O devices 714, 724 may be coupled to first link 716, along with a bridge 718 that may couple first link 716 to a second link 710. In one embodiment, second link 710 may be a low pin count (LPC) bus. Various devices may be coupled to second link 720 including, for example, a keyboard/mouse 712, communication device(s) 726 (which may in turn be in communication with a network 703), and a data storage unit 728 such as a disk drive or other mass storage device which may include code 730, in one embodiment. The code 730 may include instructions for performing embodiments of one or more of the techniques described above. Further, an audio I/O 724 may be coupled to second link 710.

Note that other embodiments are contemplated. For example, instead of the point-to-point architecture of FIG. 7, a system may implement a multi-drop bus or another such communication topology. Although links 716 and 720 are illustrated as busses in FIG. 7, any desired type of link may be used. In addition, the elements of FIG. 7 may alternatively be partitioned using more or fewer integrated chips than illustrated in FIG. 7.

Figure 8:
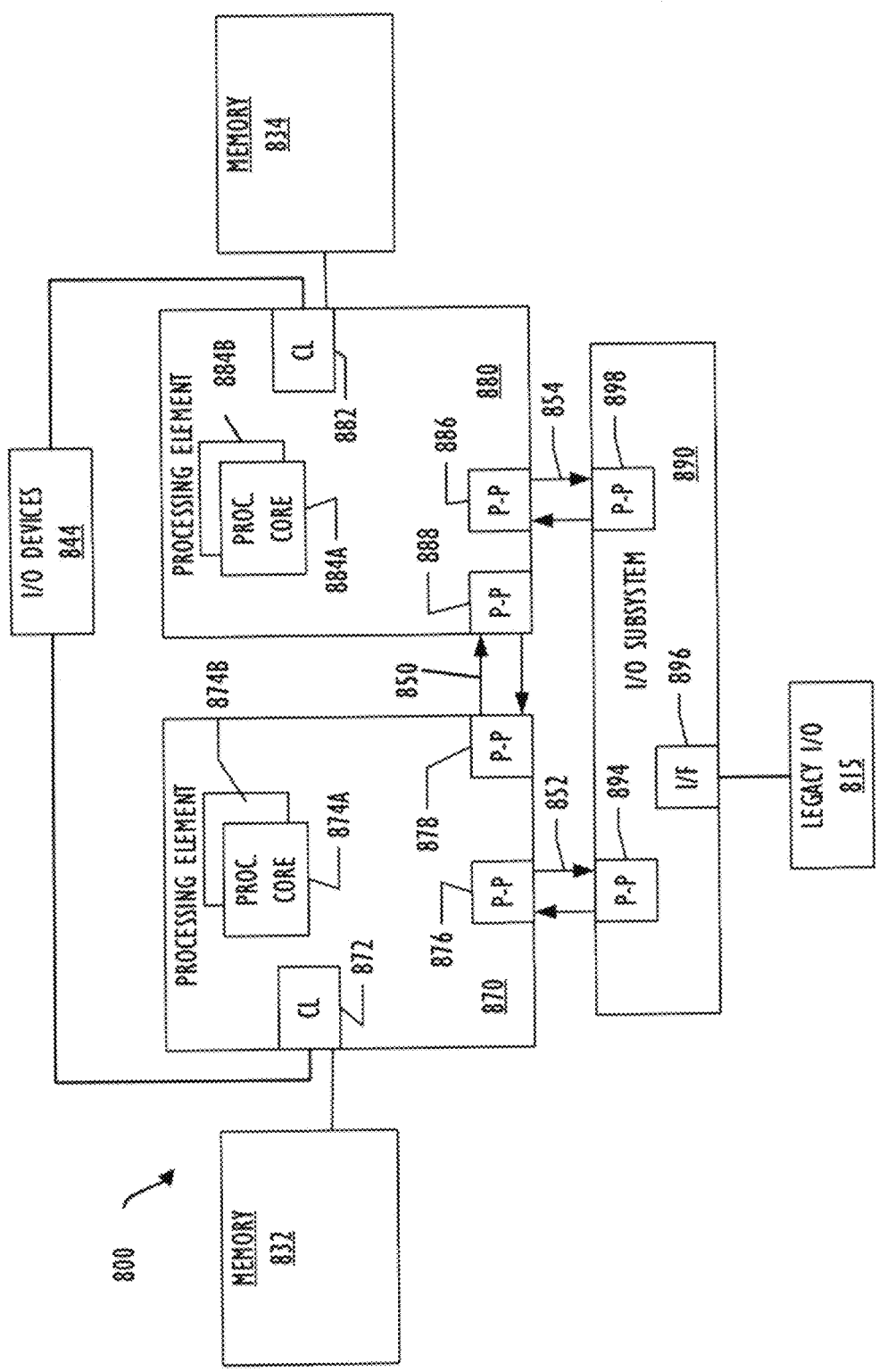
FIG. 8 is a block diagram illustrating a programmable device, according to one embodiment

Referring now to FIG. 8, a block diagram illustrates a programmable device 800 according to another embodiment. Certain aspects of FIG. 8 have been omitted from FIG. 8 in order to avoid obscuring other aspects of FIG. 8.

FIG. 8 illustrates that processing elements 870, 880 may include integrated memory and I/O control logic ("CL") 872 and 882, respectively. In some embodiments, the 872, 882 may include memory control logic (MC) such as that described above in connection with FIG. 7. In addition, CL 872, 882 may also include I/O control logic. FIG. 8 illustrates that not only may the memories 832, 834 be coupled to the CL 872, 882, but also that I/O devices 844 may also be coupled to the control logic 872, 882. Legacy I/O devices

815 may be coupled to the I/O subsystem 890 by interface 896. Each processing element 870, 880 may include multiple processor cores, illustrated in FIG. 8 as processor cores 874A, 874B, 884A and 884B. As illustrated in FIG. 8, I/O subsystem 890 includes point-to-point (P-P) interconnects 894 and 898 that connect to P-P interconnects 876 and 886 of the processing elements 870 and 880 with links 852 and 854. Processing elements 870 and 880 may also be interconnected by link 850 and interconnects 878 and 888, respectively.

The programmable devices depicted in FIGS. 7 and 8 are schematic illustrations of embodiments of programmable devices that may be utilized to implement various embodiments discussed herein. Various components of the programmable devices depicted in FIGS. 7 and 8 may be combined in a system-on-a-chip (SoC) architecture.

The following examples pertain to further embodiments.

Example 1 is a machine readable medium, on which are stored instructions for enhanced security modes for blocking network access for a set of devices, comprising instructions that when executed cause a programmable device to: receive an indication of a security mode of a plurality of security modes, the security mode comprising a set of security settings associated with a set of network connected devices, of a plurality of network connected devices connected to a local network, wherein each security mode of the plurality of security modes is associated with a different set of security settings, and wherein the set of security settings comprises at least blocking network access of the set of network connected devices; select the set of network connected devices based on the indicated security mode; and direct an application of the set of security settings to the selected set of network connected devices.

In Example 2, the subject matter of Example 1 optionally includes wherein blocking network access comprises blocking internet and intranet access.

In Example 3, the subject matter of Example 2 optionally includes wherein the indication of a security mode is received from a user device over a separate network from the local network.

In Example 4, the subject matter of Example 1 optionally includes wherein the set of security settings associated with the security mode is different from another set of security settings associated with another security mode of the set of security modes.

In Example 5, the subject matter of Example 1 optionally includes wherein the instructions further comprise instructions that when executed cause the routing device to disable a guest network based on the indication of the security mode.

In Example 6, the subject matter of Example 1 optionally includes wherein receiving the indication of the security mode comprises receiving a user selection of the security mode from a plurality of security modes from a mobile device.

In Example 7, the subject matter of Example 1 optionally includes wherein the instructions further comprise instruction that when executed cause the routing device to block joining a new device to the local network based on the indicated security mode.

Example 8, is a method for enhanced security modes for blocking network access for a set of devices, the method comprising, receiving, from a user, a first indication of a first security mode selected from a plurality of security modes, selecting a first predetermined set of network connected devices based on the first security mode, directing blocking of network access of the first predetermined set of network connected devices, directing blocking of joining a new device to a local network based on the first security mode.

In Example 9, the subject matter of Example 8 optionally includes receiving, from the user, a second indication of a second security mode selected from the plurality of security modes, selecting a second predetermined set of network connected devices based on the second security mode, blocking network access of the second predetermined set of network connected devices.

In Example 10, the subject matter of Example 8 optionally includes receiving, from the user, a selection of one or more devices, and from a plurality of devices connected to the network, assigning the selection of one or more devices to the first predetermined set of network connected devices.

In Example 11, the subject matter of Example 10 optionally includes disabling at least the blocking joining the new device to the network based on a third indication to disable the first security mode, determining that the new device is connected to the network, displaying, to the user, a fourth indication that the new device is connected to the network and the plurality of security modes to the user, receiving, from the user, a selection of the first security mode, and assigning the new device to the first predetermined set of network connected devices.

In Example 12, the subject matter of Example 8 optionally includes wherein blocking network access comprises blocking internet and intranet access.

In Example 13, the subject matter of Example 12 optionally includes wherein the first indication of the first security mode is received from a user device over a separate network from the local network.

In Example 14, the subject matter of Example 12 optionally includes wherein the first predetermined set of network connected devices is a subset of all network connected devices on the network.

In Example 15, the subject matter of Example 8 optionally includes further comprising directing another device to take one or more actions based on the indicated first security mode.

Example 16 is an apparatus for enhanced security modes for blocking network access for a set of devices, the apparatus comprising, a memory for storing instructions for enhanced security modes, one or more network interfaces operatively coupled to one or more network connected devices, a processor operatively coupled to the memory and one or more network interfaces and adapted to execute the instructions stored in the memory to cause the processor to, receive an indication of a security mode, receive an indication of a security mode, select a set of network connected devices based on the indication of the security mode, block network access of the set of network connected devices, and block joining a new device to a local network based on the indicated security mode.

In Example 17, the subject matter of Example 16 optionally includes wherein blocking network access comprises blocking internet and intranet access.

In Example 18, the subject matter of Example 17 optionally includes wherein blocking network access further comprises one of throwing away packets sent to and from a blocked device or forwarding the packets for further security processing.

In Example 19, the subject matter of Example 16 optionally includes wherein the set of network connected devices is a subset of all network connected devices on the network.

In Example 20, the subject matter of Example 16 optionally includes wherein the instructions stored in the memory further cause the processor to disable a guest network based on the indicated security mode.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A machine readable medium, on which are stored instructions for enhanced security modes, comprising instructions that when executed cause a programmable device to at least:
receive a night security mode indication in response to a user selecting a user interface element from a plurality of user interface elements on an application running on a mobile device connected to a cellular network;
determine, in response to the night security mode indication, to activate a new security mode from a plurality of security modes corresponding to the plurality of user interface elements, the new security mode including security settings associated with network connected devices connected to a local network, wherein each security mode of the plurality of security modes is associated with different security settings, and wherein the security settings includes at least configuring a remote door lock, blocking network access to a set of network connected devices from the network connected devices, and blocking joining of new devices to the local network;
select the network connected devices based on the new security mode;
direct application of the security settings to the network connected devices including configuring the remote door lock, blocking network access to the set of network connected devices from a wide area network, and blocking joining of new devices to the local network; and
cause the user interface element to be displayed as activated on the application in response to directing application of the security settings to the network connected devices.

2. The machine readable medium of claim 1, wherein blocking network access includes blocking interne and intranet access.

3. The machine readable medium of claim 2, wherein the security mode indication is received from a user device over a separate network from the local network.

4. The machine readable medium of claim 1, wherein the security settings associated with the new security mode is different from second security settings associated with a second security mode from the plurality of security modes.

5. The machine readable medium of claim 1, wherein the instructions further include instructions that when executed cause the programmable device to disable a guest network based on the security mode indication.

6. The machine readable medium of claim 1, wherein receiving the night security mode indication includes receiving a user selection of the new security mode from the plurality of security modes from a mobile device.

7. A method for enhanced security modes for blocking network access for a set of devices, the method comprising:
receiving a night security mode indication in response to a user selecting a user interface element from a plurality of user interface elements on an application running on a mobile device connected to a cellular network;
determining, in response to the night security mode indication, to activate a new security mode from a plurality of security modes corresponding to the plurality of user interface elements;
selecting a predetermined set of network connected devices based on the new security mode; and
in response to the activation of the new security mode:
configuring a remote door lock;
blocking network access to a first predetermined set of network connected devices from the predetermined set of network connected devices; and
blocking joining of new devices to a local network based on the new security mode.

8. The method of claim 7, further including:
receiving, from a user, a second security mode indication;
determining, in response to the second security mode indication, to activate a second security mode from the plurality of security modes;
selecting a second predetermined set of network connected devices based on the second security mode; and
blocking network access of the second predetermined set of network connected devices.

9. The method of claim 7, further including:
receiving, from a user, a selection of one or more devices, from a plurality of devices connected to the local network; and
assigning the selection of one or more devices to the predetermined set of network connected devices.

10. The method of claim 7, further including:
disabling at least the blocking joining of new devices to the network based on a third indication to disable the new security mode;
determining a new device is connected to the network;
displaying, to a user, a fourth indication that the new device is connected to the network and the plurality of security modes;
receiving, from the user, a selection of the new security mode; and
assigning the new device to the predetermined set of network connected devices.

11. The method of claim 7, wherein blocking network access includes blocking internet and intranet access.

12. The method of claim 7, wherein the night security mode indication is received from a user device over a separate network from the local network.

13. The method of claim 11, wherein the predetermined set of network connected devices is a subset of all network connected devices on the local network.

14. The method of claim 7, further including directing another device to take one or more actions based on the new security mode.

15. An apparatus for enhanced security, the apparatus comprising:
a memory for storing instructions for a plurality of security modes;
one or more network interfaces communicating to one or more network connected devices; and
a processor communicating to the memory and one or more network interfaces and adapted to execute the instructions stored in the memory to cause the processor to:
receive a night security mode indication in response to a user selecting a user interface element from a plurality of user interface elements on an application running on a mobile device connected to a cellular network;
determine, in response to the night security mode indication, to activate a new security mode from a plurality of security modes corresponding to the plurality of user interface elements;
select network connected devices based on the security mode indication; and
in response to the indication of the new security mode:
configure a remote door lock;
block network access to a set of network connected devices from the network connected devices; and
block joining of new devices to a local network based on the new security mode.

16. The apparatus of claim 15, wherein block network access includes block internet and intranet access.

17. The apparatus of claim 16, wherein block network access further includes one of throw away packets sent to and from a blocked device or forward the packets for further security processing.

18. The apparatus of claim 15, wherein the network connected devices is a subset of all network connected devices on the local network.

19. The apparatus of claim 15, wherein the instructions stored in the memory further cause the processor to disable a guest network based on the new security mode.

20. The apparatus of claim 15, wherein the instructions, when executed cause the processor to activate a home security system in response to the indication of the new security mode.

* * * * *

UNITED STATES PATENT AND TRADEMARK OFFICE
CERTIFICATE OF CORRECTION

PATENT NO. : 11,108,826 B2
APPLICATION NO. : 15/854521
DATED : August 31, 2021
INVENTOR(S) : Gandhi It is certified that error appears in the above-identified patent and that said Letters Patent is hereby corrected as shown below:

In the Claims

In Claim 2, Line 2, delete "interne" and insert -- internet --, therefor.

Signed and Sealed this
Thirty-first Day of May, 2022

Katherine Kelly Vidal
*Director of the United States Patent and Trademark Office*